United States Patent

[11] 3,599,004

[72] Inventor Georg Grendelmeier
 Mutschellen, Switzerland
[21] Appl. No. 4,958
[22] Filed Jan. 22, 1970
[45] Patented Aug. 10, 1971
[73] Assignee Werkzeugmaschinenfabrik Oerlikon-Buhrle AG
 Zurich, Switzerland
[32] Priority Jan. 24, 1969
[33] Switzerland
[31] 1052/69

[54] ARRANGEMENT OF PHOTOCELLS FOR THE DETERMINATION OF THE POSITION OF AN EQUIDISTANTLY DIVIDED SCALE
 6 Claims, 3 Drawing Figs.
[52] U.S. Cl. .................................................. 250/231,
 356/169, 250/209, 250/237
[51] Int. Cl. .................................................. G01d 5/34
[50] Field of Search ........................................ 250/237 G,
 231, 232, 209, 208, 220; 356/29, 139, 152, 167,
 169, 170

[56] References Cited
UNITED STATES PATENTS
| | | | |
|---|---|---|---|
| 3,096,441 | 7/1963 | Burkhardt | 250/231 X |
| 3,329,822 | 7/1967 | Rogers | 250/209 |
| 3,330,964 | 7/1967 | Hobrough et al. | 250/231 X |

Primary Examiner—Walter Stolwein
Attorney—Wenderoth, Lind & Ponack

ABSTRACT: Arrangement of photocells for the determination of the position of a scale which is divided equidistantly with respect to the photocell arrangement having a plurality of photocells equally spaced in relation to one another located in the longitudinal direction of the scale. A differential transmitter is provided for evaluating the signals produced by the photocells during the movement of the scale. The distance between two adjacent photocells being one-tenth larger or smaller than a graduation of the scale. The photocells are combined into 10 photocell pairs by connecting each photocell, together with the preceding one to a first differential transmitter and together with the following photocell, to a second differential transmitter. A mask with recesses is located in front of the photocells and the recesses are smaller in width than a graduation of the scale. Differential transmitters are connected with adjacent photocells.

Georg Grendelmeier, Inventor

ARRANGEMENT OF PHOTOCELLS FOR THE DETERMINATION OF THE POSITION OF AN EQUIDISTANTLY DIVIDED SCALE

The invention relates to an arrangement of photocells for the determination of the position of a scale which is divided equidistantly with respect to said photocell arrangement having several photocells spaced equally in relation to each other and located in the longitudinal direction of the scale, and a differential transmitter which evaluates the signals produced by the photocells during the movement of the scale.

A conventional photocell arrangement of this type has ten photocells which are situated in the longitudinal direction of the scale between two graduation lines of the scale. The photocells are spaced relative to each other by one-tenth of the graduation so that 10 signals are produced if the scale is displaced by the whole graduation. The disadvantage of this conventional photocell arrangement is that the graduation of the scale cannot be narrower than the space required by the 10 photocells.

It is the object of the invention to provide a photocell arrangement which does not have the above disadvantages. According to the invention this is achieved in that the distance between two adjacent photocells is one-tenth larger or smaller that the graduation of the scale and that the photocells are combined into 10 photocell pairs by connecting each photocell, together with the preceding one, to a first differential transmitter and together with the following photocell, to a second differential transmitter.

With the above and other objects in view which will become apparent from the detailed description below, some preferred examples of the invention are shown in the drawings in which.

Figure 1:
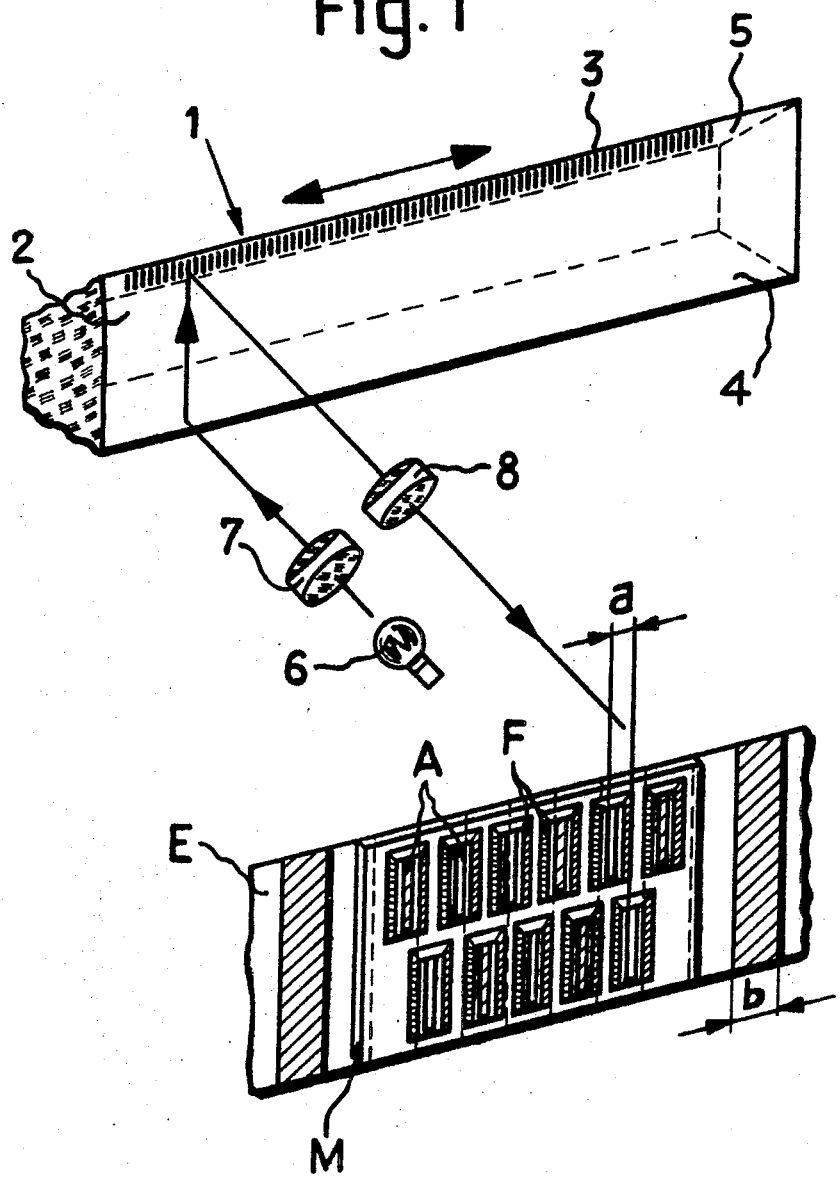
FIG. 1 shows the diagrammatic arrangement of a position measuring system.

According to FIG. 1 a scale 1 of glass is fixed to a nonillustrated and moveable machine carriage. The scale 1 has a trapezoid cross section. On a basal surface 2 of the trapezium, there are provided a number of equidistant graduation lines 3. Scale 1 has side faces 4 and 5 which are inclined in relation to the basal surface 2 at an angle of 45°. A projection lamp 6 illuminates scale 1 through a condenser lens 7 in such a manner that the light falls perpendicularly onto the basal surface 2, passes through the same and, at an angle of 45°, falls onto the inclined side face 4 of the scale 1. Thus the light is totally reflected and passes, in the scale 1, parallel to the basal surface 2 and falls onto the other side face 5 which is also inclined in relation to the light axis at 45°. Hence total reflection of the light also occurs at the side face 5, and the light leaves the scale 1 vertically to the basal surface 2, passing through the graduation lines 3 provided on the basal surface 2. In the path of the light which leaves the scale there is provided an optical projection system 8 which enlarges a section of the scale 1 in a projection plane E. In the projection plane E there is provided a mask M which has recesses A. Behind the recesses A are situated photocells F. The recesses A determine precisely the active receiving area for the photocells F.

Projection lamp 6, condenser lens 7, projection optical system 8 and mask M, together with mounted photocells F form a rigid arrangement which is connected to a nonillustrated fixed machine member.

Figure 2:
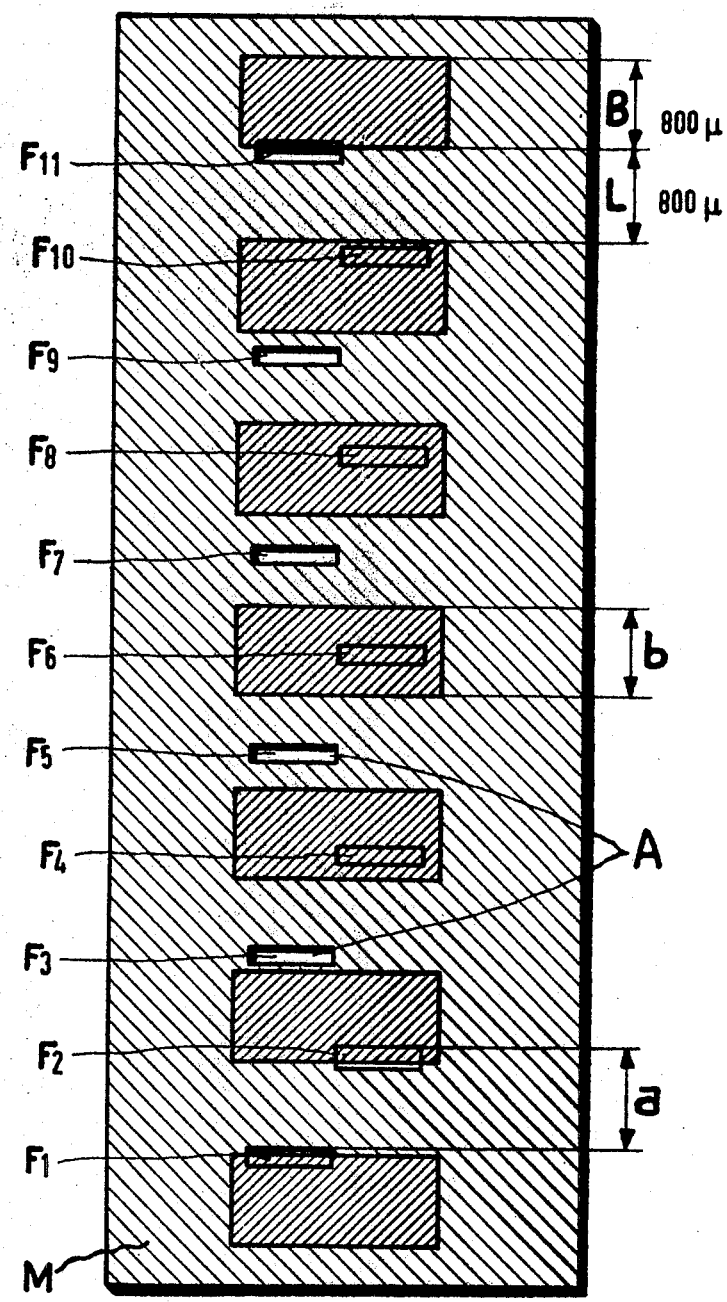
FIG. 2 shows a photocell arrangement according to an embodiment of the invention.

FIG. 2 illustrates the enlarged reproduction of scale 1 on the mask M provided in the projection plane E. The illustrated embodiment is provided with a special scale 1 in which the width B of the graduation lines 3 corresponds to the width of the gaps between the graduation lines. In this special scale there is always a light-dark-change and a dark-light-change within the width of one graduation or one gap so that in this case the width of one graduation or one gap represents the division $b$ of the scale. In the illustrated embodiment the scale 1 has for example, a 40 $\mu$ division so that with a 20-fold enlargement of the scale in the projection plane E the resulting width of a graduation or a gap is 800 $\mu$. 11 photocells $F_1$ to $F_{11}$ are situated in the mask M behind the recesses A. The 11 photocells $F_1$ to $F_{11}$ are joined for signal evaluation into 10 pairs of photocells $F_1$-$F_2$, $F_2$-$F_3$ etc., each photocell pair emitting a signal as will be hereinafter further explained with reference to FIG. 3. Corresponding to the 10 photocell pairs and to the 10 signals emitted by the same, the recesses A and thus the active receiving areas of the photocells $F_1$ to $F_{11}$ are arranged at a mutual distance of $a=b+b/10$, wherein $b$ designates the graduation of the scale 1. For reasons of spatial limitation the recesses A and the photocells $F_1$ to $F_{11}$ situated behind the latter are displaced vertically relative to each other as is also evident from FIG. 1.

Figure 3:
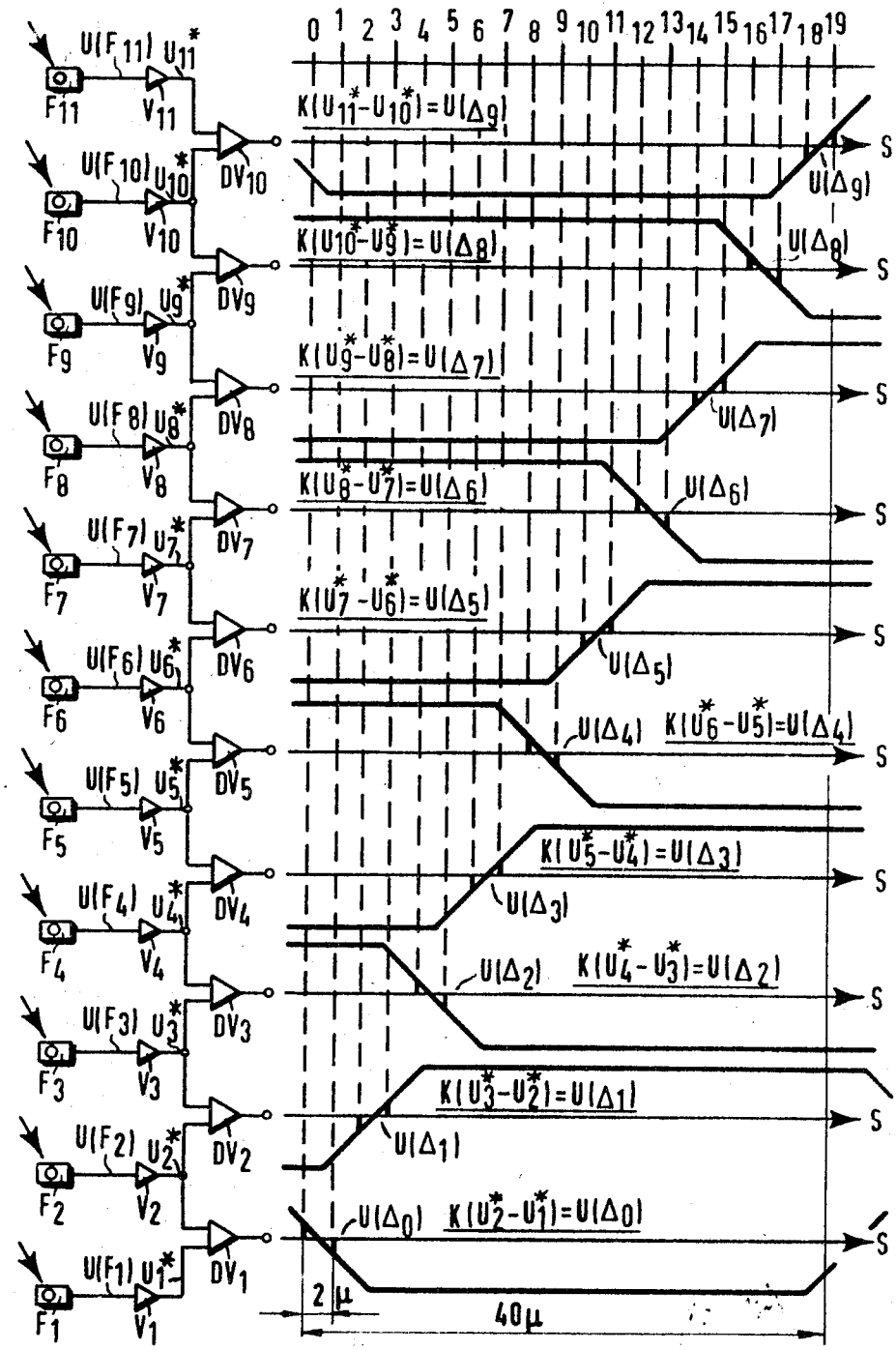
FIG. 3 shows an evaluation circuit for the photocell arrangement according to FIG. 2 and the corresponding signal pattern.

According to FIG. 3 the photocells $F_1$ to $F_{11}$ are each combined in such a manner that each photocell forms a pair with the preceding and subsequent photocell. The photovoltages $U(F_1)$ to $U(F_{11})$ are amplified in series-connected amplifiers $V_1$ to $V_{11}$. The amplified voltages $U_1^*$ to $U_{11}^*$ are fed to the inputs of differential amplifiers $DV_1$ to $DV_{10}$. At the outputs of the differential amplifiers $DV_1$ to $DV_{10}$ amplified differential voltages $U(\Delta 0)=K(U_2^*-U_1^*)$ to $U(\Delta 9)=K(U_{11}^*-U_{10}^*)$ are emitted depending on the displacement path S of the scale. The pattern of these differential voltages is illustrated in the right half of the drawing, behind the outputs of the differential amplifiers.

Thus signals can be obtained within the graduation of the scale by using, for example, the criterion of the disappearing differential voltages. In this case a signal is always emitted when both photocells of a photocell pair are masked to the same extent. In the case illustrated in FIG. 2 these are photocells $F_1$ and $F_2$. If the screen is displaced by one-tenth of the graduation then photocells $F_2$ and $F_3$ are masked to the same extent so that the differential balance applies to those. With further displacements of the scale, by one-tenth of the graduation at a time, the differential balance occurs successively with subsequent photocell pairs until, after displacement by the entire graduation, the initial condition is reached again. With a displacement of the scale by 40 $\mu$ the 10 photocell pairs with the 10 series-connected differential amplifiers produce 10 signals, the graduation interval being divided into sections of 4 $\mu$. An even finer division of the graduation interval is achieved if a signal is produced when a predetermined threshold value, of the differential voltages $U(\Delta 0)$ to $U(\Delta 9)$ emitted by the differential amplifiers $DV_1$ to $DV_{10}$ is either not reached or exceeded, as is illustrated in the right half of FIG. 3. Thus a signal is obtained even if the scale 1 is displaced by only 2 $\mu$. The graduation interval of 40$\mu$ is divided into 20 signals. In the circuit such a formation of signals may be effected by the differential amplifiers $DV_1$ to $DV_{10}$ being connected to quantification and signal-forming stages having an adjustable control resolution. By differentiating the output pulses one obtains 20 individual pulses over a displacement of the scale by 40$\mu$.

I claim:

1. Arrangement of photocells for the determination of the position of a scale which is divided equidistantly with respect to said photocell arrangement comprising a scale having graduations ($b$), a plurality of photocells equally spaced in relation to one another located in the longitudinal direction of said scale, a differential transmitter for evaluating the signals produced by said photocells during the movement of said scale, the distance ($a$) between two adjacent photocells ($F_n$, $F_{n+1}$) being one-tenth larger or smaller than a graduation ($b$) of said scale (1) and said photocells ($F_1$ to $F_{11}$) being combined into 10 photocell pairs by connecting each photocell ($F_n$), together with the preceding one ($F_n^1$), to a first differential transmitter and, together with the following photocell ($F_{n+1}$), to a second differential transmitter.

2. Arrangement of photocells according to claim 1 wherein a mask (M) having recesses (A) is provided in front of said photocells (F), said recesses (A) being arranged at the same distance as said photocells (F).

3. Arrangement of photocells according to claim 2 wherein the width of said recesses (A) is smaller than a graduation (B) of said scale (1).

4. Arrangement of photocells according to claim 1 wherein differential amplifiers (DV) are provided as differential transmitters whose inputs are each connected with two adjacent photocells ($F_n$, $F_{n+1}$).

5. Arrangement of photocells according to claim 4 wherein each differential amplifier (DV) is followed by a signal-forming stage having an adjustable control resolution.

6. Arrangement of photocells according to claim 5 wherein said control resolution is adjusted so that a signal is produced if the two photocells ($F_n$, $F_{n+1}$) which are associated with a differential amplifier (DV) are illuminated differently to a predetermined extent.